Jan. 31, 1967     L. O. VLADIMIR ETAL     3,302,201

TACTICAL LANDING APPROACH RADIO

Filed Nov. 27, 1964     2 Sheets-Sheet 1

*INVENTORS*
LEONARD O. VLADIMIR
MILTON I. LILIE
BY
ATTORNEY

United States Patent Office 3,302,201
Patented Jan. 31, 1967

3,302,201
TACTICAL LANDING APPROACH RADIO
Leonard O. Vladimir, Chappaqua, N.Y., and Milton I. Lilie, Stamford, Conn., assignors to General Precision, Inc., a corporation of Delaware
Filed Nov. 27, 1964, Ser. No. 414,129
10 Claims. (Cl. 343—106)

This invention relates to a tactical landing approach radio system in which a small lightweight ground based transmitter located at the approach end of an aircraft runway projects a beam of electromagnetic radiation and at the same time conically scans it over a limited area of aircraft approach. The aircraft using the device is provided with a small lightweight receiver which resolves the signals received from the transmitter into signals representing rectangular coordinates of the displacement of the aircraft from the axis of the conical scan. These signals are then applied to a cross-pointer indicator which visually guides the pilot on a proper glide slope approach.

More particularly the present invention constitutes an improvement on the system disclosed in application Serial Number 155,581 filed November 29, 1961, now Patent Number 3,197,777, and assigned to the same assignee as the instant application. In the system disclosed in application Serial Number 155,581, a beam of some 1° in width is transmitted by the transmitting antenna and this beam is conically rotated at a selected speed. The apex angle of the conical scan is made to be approximately equal to that of the beam width.

At the same time the transmitted beam is frequency modulated at a frequency which is the same as the speed of rotation of the conical scan.

At the aircraft the received signal is first amplitude demodulated resulting in a signal the amplitude of which is proportional to the radial departure of the aircraft position from the axis of cone of scan of the transmitted beam. At the same time the phase of this signal is representative of the angular departure of the aircraft from some reference direction, say the vertical. The received signal is also frequency demodulated recovering the frequency modulated signal introduced by the transmitter and using this signal as a reference phase the polar coordinate informational content of the amplitude modulations is converted to rectangular coordinate signal representations of aircraft position with respect to conical scan axis. These latter signal representations are then applied to a cross-pointer indicator which provides the pilot with visual indications of aircraft position with respect to proper approach path. In such an arrangement it has been found that certain system errors are likely to be introduced. Because the frequency of the frequency modulation is the same as the frequency of the amplitude modulation, produced at the receiver by the sweeping of the transmitted beam past the receiver as it is conically scanned, there may be some leakage of the amplitude modulated signals into the frequency demodulation portion of the system producing an error in reference phase and hence error in indicated aircraft position with respect to approach angle.

Likewise it has also been discovered that while the inherent damping of the needle bale movements are sufficient when the aircraft is some distance from the transmitter, say ten miles, and the aircraft is suddenly blown off course by 50 feet due to sudden wind shifts, this damping is quite inadequate when the same course shift occurs quite close to the transmitter. When such a shift occurs at relatively short distances from the transmitter the signal change applied to the indicator movements is proportionally larger, since the area covered by the conical beam scan is much smaller, and there is a tendency for the indicator bales to overswing.

Both of these difficulties are corrected by the present invention. The problem of leakage of amplitude modulated signal into the frequency demodulation circuits is circumvented by reducing the frequency of the frequency modulations to a submultiple of the speed of rotation of the conical scan of the transmitting beam and then after these lower frequency modulated signals have been detected, multiplying the frequency thereof until they equal in frequency the speed of rotational antenna scan. Because the amplitude modulated signals are at least double the frequency of the frequency modulated signals applied to the frequency modulation detection circuits they can be filtered out without difficulty.

The problem of sudden shifts in aircraft position at close approaches and hence overswing of indicator bales is solved by introducing circuit arrangements for variably damping the needle bale movements. More specifically the bale movements are damped by an amount which is inversely proportional to the strength of the received signal and hence the distance of the aircraft receiver from the transmitter.

It is an object then of this invention to provide an approach and landing system which while light in weight and relatively inexpensive is nevertheless highly accurate and reliable.

A further understanding of the invention will become readily apparent from the following detailed description when taken in conjunction with the drawing in which.

Figure 1:
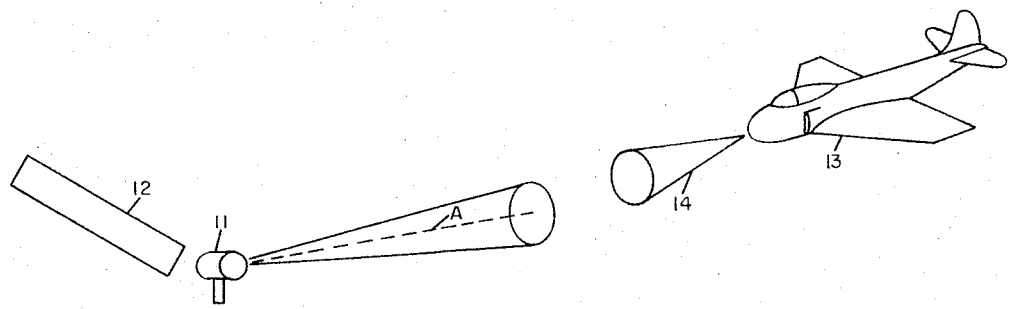
FIGURE 1 is a diagrammatic representation of the aircraft landing runway, the transmitter and an approaching airplane carrying a receiver.

Referring now to FIG. 1, a transmitter 11 is located at the approach end of a runway 12. Because the transmitter is of small size, hardly larger than an 18 inch paraboloid used as its antenna, it may be located at the runway rather than to one side thereof as has been the case in past instrumentations. The antenna of the transmitter projects a directional signal beam which may, for example, have a width of 3° between half power points. At the same time this signal beam is conically rotated about an axis A so that it circumscribes a cone having an apex angle of, for example, 3°. This is exaggerated in the drawing for purposes of clarity. Using the angles given as examples the transmitted beam will at a distance of ten nautical miles cover a circular area of one nautical mile in diameter with the area covered becoming progressively small at lesser distances from the transmitter.

The receiver is mounted in an airplane 13 and includes a small horn antenna having a receptivity pattern 14, of say, 60° in angular extent. As will be explained more fully hereinafter, the receiver is so instrumented that the informational content of the transmitted signal as impressed on the receiver produces an indication in rectangular coordinates of the departure of the airplane from exact coincidence with the axis A. Thus by so flying the airplane as to maintain these departure indications at zero the pilot is enabled to fly down the proper approach path.

Figure 2:
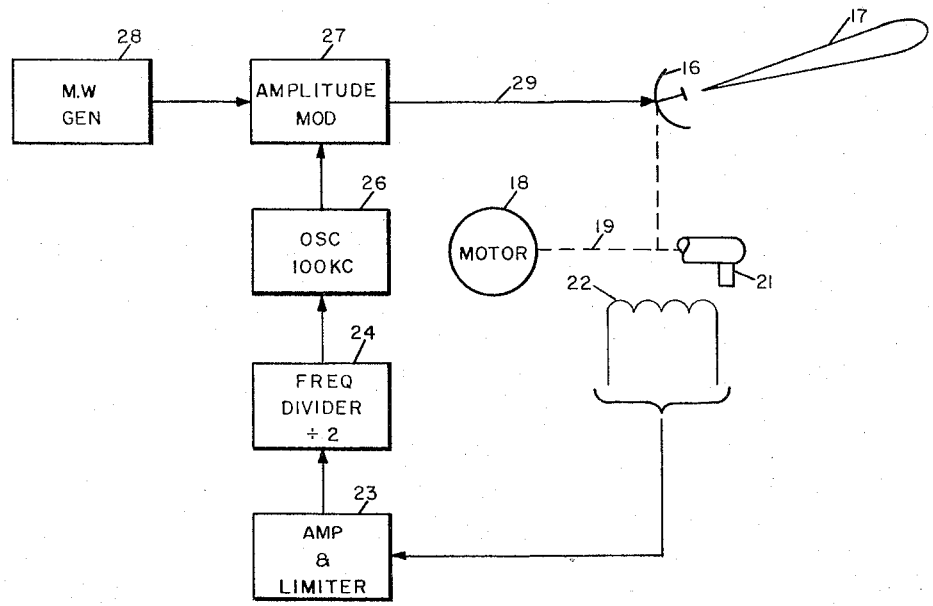
FIGURE 2 is a block diagram of the transmitter.

Turning now to FIG. 2 which discloses the transmitter instrumentation, an antenna 16, which may be of the parabolic type projects a 3° signal beam 17 at a selected glide slope angle. At the same time as heretofore indicated this beam is conically scanned over a conical surface having a 3° apex angle. In the drawing the mechanism for providing this conical scan is diagrammatically shown as a motor 18 which physically rotates the antenna 16 through a shaft 19. It will be appreciated, however, that other arrangements may be used for rotating the transmitted beam including electronic arrangements. Whatever arrangement is used the beam is rotated at a rate of 6000 revolutions per minute, i.e., 100 revolutions per second.

At the same time pulse signals are generated in synchronism and phase with the rotation of the transmitted beam. As shown in the drawing the extension of the shaft 19 is provided with a magnetic member 21 which rotates past the pickup coil 22 generating a pulse therein on each revolution of the transmitted beam 17. The 100 c.p.s. pulses so generated are impressed on an amplifier and limiter circuit 23, the output of which is imposed on a frequency divider 24. The frequency divider may be a simple scale of two circuit which produces at its output pulses at a rate of 50 c.p.s. thus dividing its input by a factor of two.

The output of the frequency divider 24 is applied to a 100 kc. oscillator 26 in such a fashion as to frequency modulate the signal generated thereby so that the output of the oscillator 26 constitutes a 100 kc. signal frequency modulated at a 50 c.p.s. rate. This frequency modulated signal is in turn applied to an amplitude modulator 27 which also has the output of the microwave generator 28 applied thereto.

The output of the amplitude modulator thus consists of a signal at the carrier frequency of the microwave generator amplitude modulated by a 100 kc. signal which latter signal is also frequency modulated at a frequency of 50 c.p.s. This signal is imposed on the antenna 16 through the conductor 29 and the informational contents thereof is radiated into space over a conical scan as heretofore stated to be picked up by an approaching airplane and converted into positional indications.

Figures 3, 4:
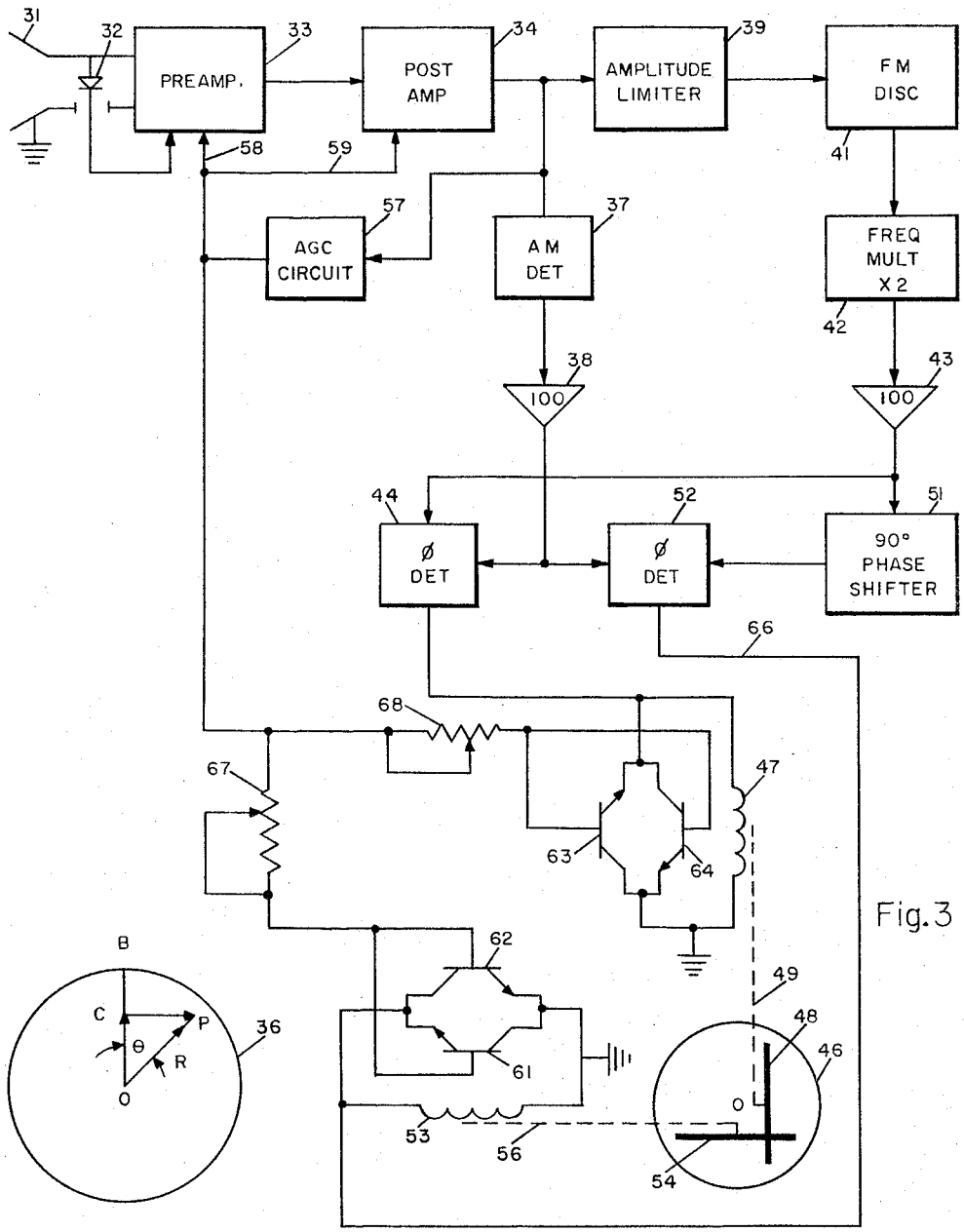
FIGURE 3 is a block and schematic diagram of the receiver.
FIGURE 4 is a diagram used in explaining the operation of the system.

Turning now to FIG. 3 and the receiver circuit carried by the approaching airplane, the transmitted signals are received by a horn antenna 31 which may have a receptivity pattern of say, 60° although this is not critical. The received signals are amplitude demodulated by a crystal rectifier 32 to recover the 100 kc. amplitude modulation signal and this signal is in turn amplified by a preamplifier 33 and a post amplifier 34.

Consider now the signal present at the output of the post amplifier 34. This signal is a 100 kc. signal frequency modulated at 50 c.p.s. As received by an airplane approaching the transmitter and within the revolving pattern of the beam 17 the signal may also be amplitude modulated at a frequency of 100 c.p.s.

The factors which give rise to this amplitude modulation may best be explained by reference to the diagram of FIG. 4 in which the circle 36 indicates the path of revolution of the transmitted beam 17 about an axis represented by the point O. Let it be assumed that the approaching airplane is at a point P displaced from the axis about which the transmitted beam rotates. Then as the rotating beam sweeps past the airplane on each revolution the signal as seen by the airplane will increase to a maximum when the beam is directed toward the plane and to a minimum 180° displaced therefrom. The amplitude of the signal as perceived by the airplane will have a value which is proportional to the radial departure of the airplane from the axis of beam rotation, namely, proportional to the vector R, and will have a phase with respect to some selected data direction, say, the vector OB proportional to the angle $\phi$. Thus amplitude modulation data is present which contains information in polar coordinates of the displacement of the airplane from the desired glide angle approach defined by the axis about which the transmitted beam rotates.

This amplitude modulation information having a frequency of 100 c.p.s., the rate of rotation of the transmitted beam is recovered from the output of the post amplifier 34 (FIG. 3) by an amplitude modulation detector 37 and this amplitude modulation signal is in turn impressed on an amplifier 38 tuned to 100 c.p.s. The output of tuned amplifier 38 therefore consists of a signal whose phase and amplitude represents the polar coordinate positional displacement of the airplane from its desired course.

In order to be of value, however, the phase of this signal must be referred to some datum point and it is also desirable to convert the polar coordinate representation to a rectangular coordinate representation for application to standard indicator movements.

In order to accomplish this the output of the post amplifier 34 is impressed on an amplitude limiter 39 and in turn on a frequency modulation discriminator 41 to recover the frequency modulation content of the transmitted beam by frequency demodulation. It will be recalled that this frequency modulation signal is at 50 c.p.s. or half that of the amplitude modulation frequency by reason of the frequency division in the transmitter.

The output of the frequency demodulator or discriminator 41 which now consists of an amplitude modulation signal at a frequency of 50 c.p.s. is returned to a value which corresponds to the rate of rotation of the transmitted beam by being impressed on a frequency multiplier or doubler 42 so that the output thereof is an amplitude modulated signal at a frequency of 100 c.p.s. This signal is amplified by an amplifier 43 tuned to 100 c.p.s. and the output signal of this amplifier constitutes a datum phase signal used for position interpretation and coordinate conversion. Any amplitude modulation signal that might leak through the amplitude limiter 39 and frequency modulation discriminator 41 is also frequency multiplied by the multiplier 42 and hence converted to a 200 c.p.s. signal. This is easily filtered out by the amplifier 43 tuned to 100 c.p.s.

At the transmitter each time the magnetic member 21 rotated past the coil 22 a pulse signal was generated which formed the basis for the frequency modulated content of the transmitted beam. Let it be assumed that this signal was generated when the transmitted beam was at the point B of FIG. 4. The phase of the frequency modulated signal and hence the phase of the amplitude modulated signal at the output of amplifier 43 (FIG. 3) is in consequence an exact indication of transmitter beam rotational position.

This signal together with the amplitude modulation signal present at the output of amplifier 38 is impressed on the phase detector 44. By operation of the phase detector 44 a signal is produced at the output thereof which is proportional to the horizontal displacement of the airplane at point P from the datum phase reference represented by the vector OB, namely, a signal having an amplitude proportional to the vector CP. This signal is applied to the horizontal movement of a cross-pointer indicator 46 represented by the coil 47 operating the horizontal indicator bale 48 through the mechanical linkage 49.

In order to obtain a signal representative of the vertical displacement of the airplane from the axis of rotation of the transmitted beam that is proportional to the vector OC of FIG. 4, the output of the amplifier 43 (FIG. 3) constituting the datum phase reference signal is phase shifted 90° by the phase shifter 51 and this phase shifted signal together with the output of amplifier 38 is impressed on a second phase detector 52. The output of phase detector 52 constituting a signal having a magnitude representing vector OC or vertical displacement is then impressed on the vertical movement of the cross-pointer indicator 46 as represented by coil 53 connected to the vertical bale 54 through the linkage 56. Thus the pilot of the airplane need only so fly his craft as to maintain the intersection of the cross-pointer indicator bales 48 and 54 at the center or zero point of the indicator 46 to maintain his craft on the axis of rotation of the transmitted beam and hence on the proper glide approach.

When the airplane is at some distance from the transmitter, say ten nautical miles, the circular area covered by the rotation of the transmitted beam is of considerable size being approximately one nautical mile in diameter. At this distance if a sudden wind change should cause the airplane to veer off course by, say, 50 feet, the signal amplitude change indicating this displacement and applied to the coils 47 and 53 would not be large and the inherent damping of the cross-pointer indicator movements is sufficient to overcome indicator bale overswing. When, however, the airplane is but a short distance from the transmitter a different situation pertains. In such a case the circular area covered by the rotating transmitted beam is relatively much smaller and the same 50 foot sudden course shift will produce a large change in the signal applied to the indicator coils 47 and 53 resulting in a large overswing of the indicator movements making pilot correction difficult. To obviate this difficulty the present invention provides an arrangement whereby the indicator movements are variably damped, the amount of damping increasing as the received signal strength increases thus increasing as the distance of the airplane from the transmitter decreases.

An automatic gain control circuit 57 has its input connected to the output of the post amplifier 34. This gain control circuit, as is usual in the art, may consist of rectifier and amplifier circuits which supply gain control potentials to the appropriate control electrodes of the preamplifier and post amplifier circuits through conductors 58 and 59. In addition, the gain control signal output of the automatic gain control circuit is applied to the bases of two pairs of transistors 61, 62 and 63, 64; each pair being connected across a respective one of the indicator coils 53 and 47.

Consider first the transistors 61 and 62 connected across indicator coil 53. The automatic gain control potential is applied to the base of each and the emitter of transistor 61 is connected to the collector of transistor 62; while the emitter of transistor 62 is connected to the collector of transistor 61. One common emitter-collector junction is connected to one end of the coil 53 while the other end of the coil is connected to the other common emitter junction. It will be appreciated that the signal derived from phase detector 52 and applied to coil 53 over conductor 66 may be positive or negative depending on whether the vertical departure indication is above or below the horizontal. Thus with NPN transistors as illustrated the poling of the potential applied to these transistors by the potential across the coil 53 will be such as to render transistor 62 active when the signal applied to coil 53 is positive and transistor 61 active when the signal is negative. Using, by way of example only, transistors such as 2N697 or 2N2218 the resistance effectively placed in shunt to coil 53 may be varied over a range of from several hundred to several thousand ohms. This is quite sufficient to provide the required inverse variation in damping as respects distance thereby preventing indicator overswing. The amount of automatic gain control signal applied to the transistor pair and hence the amount of damping at a selected level of automatic gain control may be adjusted by adjustment of the attenuator 67.

The automatic gain control signal is also imposed on the transistor pair 63 and 64 connected across coil 47 through the attenuator 68 and since these transistors are connected similarly to and operate in the same manner as transistors 61 and 62, further description and discussion thereof would be redundant and is unnecessary.

In the above description the signal used for frequency modulation was divided by two in the transmitter and multiplied by two in the receiver. It will be appreciated, however, that the operation is not restricted to the use of these particular numbers. The signal may be divided by any other number in the transmitter if it is multiplied by the same number in the receiver. The number two has, however, the advantage of providing the simplest circuitry. Likewise the invention has been described in reference to a beam of transmitted signal having a width between half power points of 3° and a conical rotation apex angle of 3° but it is to be understood that these angular dimensions are not critical and are given by way of example only.

What is claimed is:
1. A tactical landing approach radio system comprising,
 a ground based transmitter including an antenna radiating a directive beam of signal energy,
 means for rotating said directive beam of signal energy in a conical scan about an axis at a selected rate of rotation,
 means operated in synchronism with the rotation of said directive beam for generating a reference signal having a frequency equal to the rate of rotation of said directive beam and a phase dependent on the positional displacement thereof,
 frequency dividing means dividing the frequency of said reference signal by a selected number,
 a local oscillator,
 means for frequency modulating the output of said local oscillator by the output of said frequency dividing means,
 a microwave generator,
 means for amplitude modulating the output of said microwave generator by the frequency modulated output of said local oscillator to produce a modulated transmission signal,
 means for imposing said modulated transmission signal on said antenna to provide said directive beam of signal energy,
 an airborne receiver including an amplitude modulation detector deriving a signal from said directive signal beam having a frequency equal to the rate of rotation of said directive beam of signal energy,
 a frequency modulation detector producing an output signal having a frequency equal to the frequency modulation component of said directive signal beam,
 means for multiplying the output signal frequency of said frequency modulation detector by said selected number,
 means for detecting the phase relation of the output of said amplitude modulation detector relative to the multiplied output of said frequency modulation detector, and
 indicator means energized by the output of said last mentioned means.

2. A tactical landing approach radio system as set forth in claim 1 including means for variably damping said indicator means in inverse relation to the distance between said airborne receiver and said ground based transmitter.

3. A tactical landing approach radio system as set forth in claim 1 in which said selected number is two.

4. A tactical landing approach radio system as set forth in claim 3 including means for variably damping said indicator means in inverse relation to the distance between said airborne receiver and said ground based transmitter.

5. A tactical landing approach radio system comprising,
 a ground based transmitter including an antenna radiating a directive beam of signal energy,
 means for rotating said directive beam of signal energy in a conical scan about an axis at a selected rate of rotation,
 a local oscillator,
 means for frequency modulating the output of said local oscillator by a signal whose frequency is dependent on the rate of rotation of said directive beam,
 a microwave generator,
 means for amplitude modulating the output of said microwave generator by the frequency modulated output of said local oscillator to produce a modulated transmission signal, means for imposing said modulated transmission signal on said antenna to provide said directive beam of signal energy, an airborne receiver including an amplitude modulation detector deriving a signal from said beam of signal energy the phase and frequency of which are dependent on the amplitude variation of said beam as received by said receiver, a frequency modulation detector producing an output signal the phase and frequency of which are dependent on the frequency modulation content of said beam as received by said receiver, means operated by the outputs of said amplitude modulation detector and said frequency modulation detector producing first and second indicator signals proportional respectively to the horizontal and vertical coordinates of position of said airborne receiver with respect to the axis of rotation of said directive beam of signal energy, a cross-pointer indicator having horizontal and vertical needle movements, means imposing said first indicator signal on said horizontal movement and said second indicator signal on said vertical movement, an automatic gain control circuit for said receiver generating an automatic gain control signal whose magnitude is proportional to the magnitude of the signal imposed on said receiver, and means operated by said automatic gain control signal for variably damping said needle movement in proportion to the magnitude of said automatic gain control signal.

6. A tactical landing approach radio system comprising, a ground based transmitter including an antenna radiating a directive beam of signal energy, means for rotating said directive beam of signal energy in a conical scan about an axis at a selected rate of rotation, a local oscillator, means for frequency modulating the output of said local oscillator by a signal whose frequency is dependent on the rate of rotation of said directive beam, a microwave generator, means for amplitude modulating the output of said microwave generator by the frequency modulated output of said local oscillator to produce a modulated transmission signal, means for imposing said modulated transmission signal on said antenna to provide said directive beam of signal energy, an airborne receiver including an amplitude modulation detector deriving a signal from said beam of signal energy the phase and frequency of which are dependent on the amplitude variation of said beam as received by said receiver, a frequency modulation detector producing an output signal the phase and frequency of which are dependent on the frequency modulation content of said beam as received by said receiver, means operated by the outputs of said amplitude modulation detector and said frequency modulation detector producing first and second indicator signals proportional respectively to the horizontal and vertical coordinates of position of said airborne receiver with respect to the axis of rotation of said directive beam of signal energy, a cross-pointer indicator having horizontal and vertical movement coils, means imposing said first indicator signal on said horizontal coil, means imposing said second indicator signal on said vertical coil, an automatic gain control circuit for said receiver generating an automatic gain control signal whose magnitude is proportional to the magnitude of the signal imposed on said receiver, a first pair of transistors having base, emitter and collector electrodes, the emitter of one transistor of said pair being connected to the collector of the other transistor of said pair and the emitter of said other transistor of said pair being connected to the collector of said one transistor of said pair with the respective common junction of said collectors and emitters connected to respective opposite ends of said horizontal coil, a second pair of transistors having base, emitter and collector electrodes, the emitter of one transistor of said second pair being connected to the collector of the other transistor of said second pair and the emitter of said other transistor of said second pair being connected to the collector of said one transistor of said second pair with the respective common junctions of said collectors and emitters of said second pair of transistors connected to respective opposite ends of said vertical coil, and means imposing said automatic gain control signal on all of the base electrodes of said first and second pair of transistors.

7. A tactical landing approach radio system comprising, a ground based transmitter including an antenna radiating a directive beam of signal energy, means for rotating said directive beam of signal energy in a conical scan about an axis at a selected rate of rotation, means operated in synchronism with the rotation of said directive beam for generating a reference signal having a frequency equal to the rate of rotation of said directive beam and a phase dependent on the positional displacement thereof, frequency dividing means dividing the frequency of said reference signal by a selected number, a local oscillator, means for frequency modulating the output of said local oscillator by the output of said frequency dividing means, a microwave generator, means for amplitude modulating the output of said microwave generator by the frequency modulated output of said local oscillator to produce a modulated transmission signal, means for imposing said modulated transmission signal on said antenna to provide said directive beam of signal energy, an airborne receiver including an amplitude modulation detector deriving a signal from said directive signal beam having a frequency equal to the rate of rotation of said directive signal beam, a frequency modulation detector producing an output signal having a frequency equal to the frequency modulation component of said directive signal beam, means for multiplying the output signal frequency of said frequency modulation detector by said selected number, means operated by the outputs of said amplitude modulation detector and the output of said frequency multiplying means producing first and second indicator signals proportional respectively to the horizontal and vertical coordinates of position of said airborne receiver with respect to the axis of rotation of said directive signal beam, a cross-pointer indicator having horizontal and vertical needle movements, means imposing said first indicator signal on said horizontal needle movement and said second signal on said vertical needle movement, an automatic gain control circuit for said receiver generating an automatic gain control signal whose magnitude is proportional to the magnitude of the signal imposed on said receiver, and means operated by said automatic gain control signal for variably damping said needle movements in proportion to the magnitude of said automatic gain control signal.

8. A tactical landing approach radio system as set forth in claim 7 in which said selected number is two.

9. A tactical landing approach radio system comprising, a ground based transmitter including an antenna radiating a directive beam of signal energy, means for rotating said directive beam of signal energy in a conical scan about an axis at a selected rate of rotation, means operated in synchronism with the rotation of said directive beam for generating a reference signal having a frequency equal to the rate of rotation of said direction beam and a phase dependent on the positional displacement thereof, frequency dividing means dividing the frequency of said reference signal by a selected number, a local oscillator, means for frequency modulating the output of said local oscillator by the output of said frequency dividing means, a microwave generator, means for amplitude modulating the output of said microwave generator by the frequency modulated output of said local oscillator to produce a modulated transmission signal, means for imposing said modulated transmission signal on said antenna to provide said directive beam of signal energy, an airborne receiver including an amplitude modulation detector deriving a signal from said directive signal beam having a frequency equal to the rate of rotation of said directive signal beam, a frequency modulation detector producing an output signal having a frequency equal to the frequency modulation component of said directive signal beam, means for multiplying the output signal frequency of said frequency modulation detector by said selected number, means operated by the outputs of said amplitude modulation detector and the output of said frequency multiplying means producing first and second indicator signals proportional respectively to the horizontal and vertical coordinates of position of said airborne receiver with respect to the axis of rotation of said directive signal beam, a cross-pointer indicator having horizontal and vertical movement coils, means imposing said first indicator signal on said horizontal coil, means imposing said second indicator signal on said vertical coil, an automatic gain control circuit for said receiver generating an automatic gain control signal whose magnitude is proportional to the magnitude of the signal imposed on said receiver, a first pair of transistors having base, emitter and collector electrodes, the emitter of one transistor of said pair being connected to the collector of the other transistor of said pair and the emitter of said other transistor of said pair being connected to the collector of said one transistor of said pair with the respective common junctions of said collectors and emitters connected to respective opposite ends of said horizontal coil, a second pair of transistors having base, emitter and collector electrodes, the emitter of one transistor of said second pair being connected to the collector of the other transistor of said second pair, and the emitter of said other transistor of said second pair being connected to the collector of said one transistor of said second pair with the respective common junction of said collectors and emitters of said second pair of transistors connect to respective opposite ends of said vertical coil, and means imposing said automatic gain control signal on all of the base electrodes of said first and second pair of transistors.

10. A tactical landing approach radio system as set forth in claim 9 in which said selected number is two.

References Cited by the Examiner

UNITED STATES PATENTS

| | | | |
|---|---|---|---|
| 2,252,699 | 8/1941 | Byrne | 343—106 |
| 2,439,044 | 4/1948 | Ferrill | 343—108 |
| 2,511,030 | 6/1950 | Woodward | 343—106 |
| 2,954,555 | 9/1960 | Guttinger et al. | 343—108 |
| 3,197,777 | 7/1965 | McKay | 343—108 |
| 3,255,984 | 6/1966 | Hawes | 343—106 |

CHESTER L. JUSTUS, *Primary Examiner.*

H. C. WAMSLEY, *Assistant Examiner.*